Jan. 13, 1925.
S. PAPP
1,522,591
AUTOMOBILE DIRECTION INDICATOR
Filed Dec. 12, 1922   2 Sheets-Sheet 2
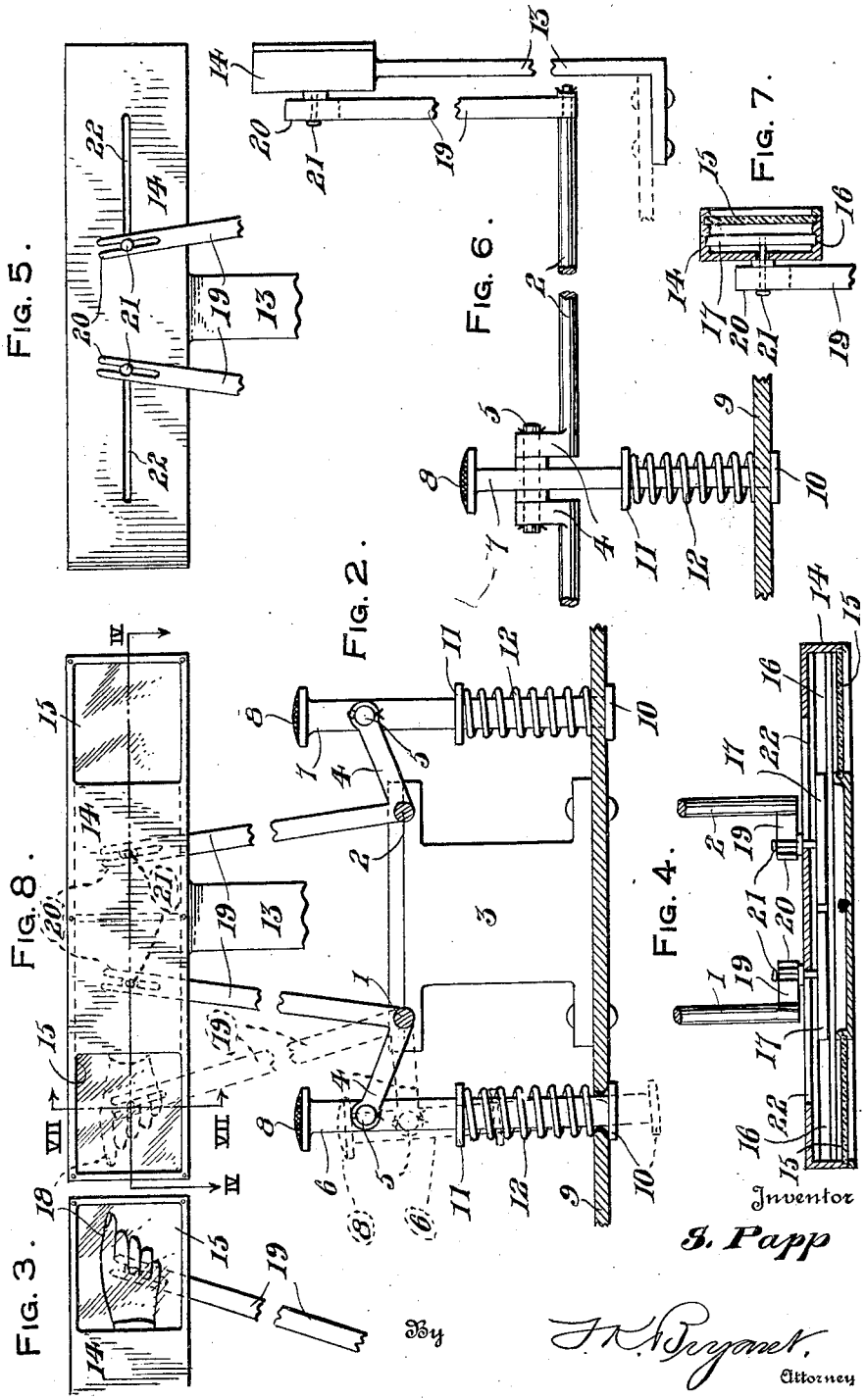
Inventor
S. Papp Patented Jan. 13, 1925.

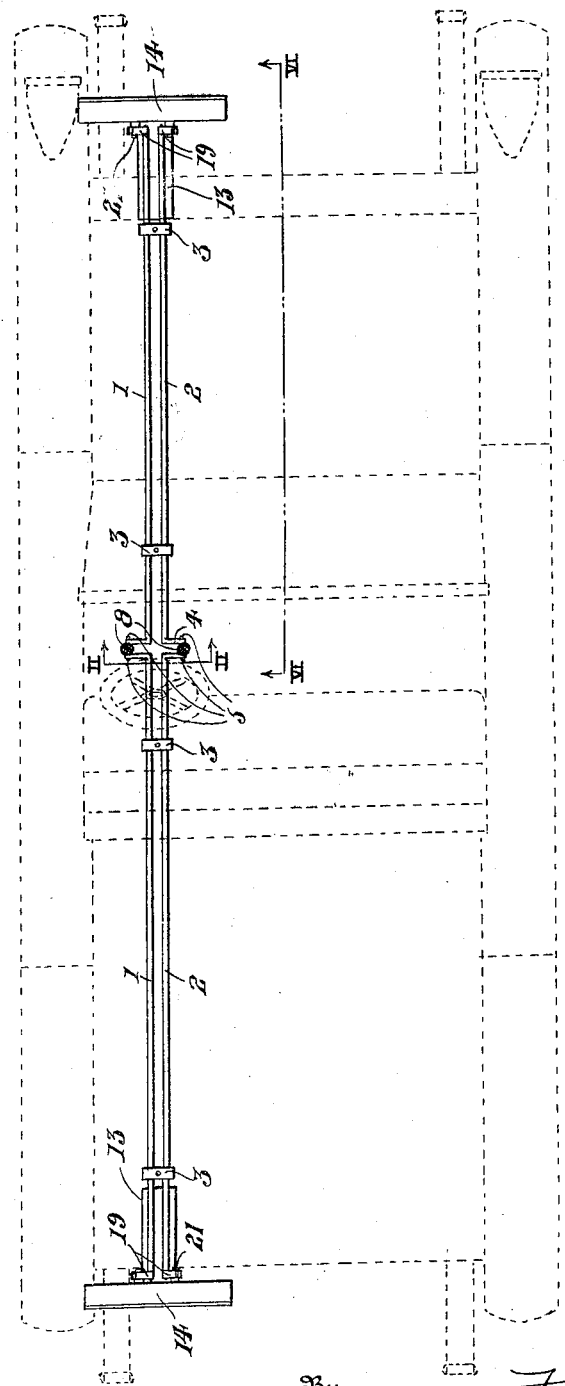

1,522,591

UNITED STATES PATENT OFFICE.

STEVE PAPP, OF EXPEDIT, PENNSYLVANIA.

AUTOMOBILE DIRECTION INDICATOR.

Application filed December 12, 1922. Serial No. 606,448.

*To all whom it may concern:*

Be it known that I, STEVE PAPP, a citizen of Hungary, residing at Expedit, in the county of Cambria and State of Pennsylvania, have invented certain new and useful Improvements in Automobile Direction Indicators, of which the following is a specification.

This invention relates to certain new and useful improvements in automobile direction indicators and has particular reference to a manually operable device upon a motor vehicle for indicating the proposed direction of travel to other vehicle operators and pedestrians.

The primary object of the invention resides in the provision of a manually operable direction indicator for automobiles, the proposed direction of travel thereof in turning to either the right or left, indicator devices being carried by the front and rear ends of the automobile and being clearly viewable in either day or night.

Another object of the invention embodies in a direction indicator for automobiles, manually operable devices for said indicators arranged adjacent the seat of the driver to be readily accessible for operation to indicate whether the automobile proposes a change in direction of travel to either the right or left.

The invention further embodies in an indicator of the type above set forth which has the provision of an illuminous hand or indicator arm that is clearly viewable either day or night without the necessity of providing illuminating devices such as lamps.

With the above general objects in view the invention consists of the novel combination and arrangement of parts hereinafter more fully described in connection with accompanying drawing, and in which like reference characters designate corresponding parts throughout the several views.

In said drawing:—

Figure 1 shows by dotted lines a top plan view of an automobile with the present invention operatively positioned thereon, Figure 2 is a cross sectional view taken on line II—II of Figure 1 showing the foot operated tension plunger rods for shifting the indicator hands, Figure 3 is a fragmentary front elevational view of one of the indicator casings with the signal hand projected to a viewable position, Figure 4 is a cross sectional view taken on line IV—IV of Figure 8 showing the guides in the casing for the slidably mounted indicator hand and the arms for shifting the hand, Figure 5 is a fragmentary rear elevational view of one of the indicator casings showing the connection between the indicator hand and the crank arm, Figure 6 is a longitudinal sectional view taken on line VI—VI of Figure 1 showing the connection between the foot operated plunger rod and the shaft for shifting the indicator hand, Figure 7 is a detail sectional view taken on line VII—VII of Figure 8, and Figure 8 is a fragmentary front elevational view of the indicator casing showing the window openings at each end thereof.

Referring more in detail to the accompanying drawings, and particularly to Figure 1, there is diagrammatically shown by dotted lines a top plan view of an automobile equipped with the present device for indicating the direction of travel, said device including an indicator casing arranged at the front and rear ends of the automobile with the manually operable devices for shifting the indicator hands located in said casing, being positioned adjacent the driver's seat as illustrated.

The operating means for the indicators includes a pair of parallel shafts 1 and 2 arranged forwardly and rearwardly of the driver's seat as indicated in Figure 1, said shafts being journaled in bearings 3 shown in detail in Figure 2, the adjacent ends of the axially aligned shafts 1 and 2 being connected to a foot operated plunger rod so that either of the sets of aligned shafts 1 or 2 may be independently operated. The connection between said shaft and the foot operated plunger rod is shown more clearly in Figures 1, 2, and 6, the adjacent end of said shaft carrying crank arms 4 having the outer ends thereof journaled on the pins 5 carried by the plunger rods 6 and 7 for each set of shafts 1 and 2 respectively. Each plunger rod 6 and 7 carries a foot engaging pedal 8 upon the upper end thereof with the lower end or shank portion freely extending through an opening in the bottom or floor 9 of the automobile with a head 10 formed upon the extreme lower end thereof. As shown more clearly in Figures 2 and 6, a disk or washer 11 is secured to each plunger rod 6 and 7 while a coil spring 12 surrounds the rod between the floor 9 and said disk and normally forcing the plunger rod at its limit of its upward movement.

The indicator casings associated with each end of the automobile are of identical construction, each comprising a mounting bracket 13 carrying a casing 14 at the upper end thereof. A window opening 15 is provided in the front wall of the casing in each end thereof. As shown in Figures 4 and 7, the top and bottom walls of the casing are provided with guideways 16, between which plates 17 are slidably mounted, each plate having painted or otherwise impressed thereon a luminous indicator hand 18 that is viewable through the window opening 15 of the casing during both day and night, the hand 18 being of luminous material eliminating the necessity of providing electric lamps or other form of illuminating means. The connection between the indicator plates 17 and the shafts 1 and 2 includes an arm 19 fixed to the outer end of each of said shafts with the upper end of each arm 19 being forked as at 20, shown more clearly in Figures 5 and 8, to receive therein the pins 21 projecting from the rear sides of the indicator plates 17 that extend through slotted openings 22 provided in the rear wall of the indicator casing as shown in Figure 4.

From the above detailed description of the device, it is believed that the construction and operation thereof will at once be apparent, it being noted that the tensioned foot operated plunger rods 6 and 7 are disposed adjacent the driver's seat as shown in Figure 1, the plunger rod 6 being associated with the shafts 1, while the plunger rod 7 is associated with the shafts 2, intended respectively for operating the left or right hand direction signals. Should it be desired, to turn the automobile in either direction, as to the left or right, one of the plungers 6 or 7 is depressed against the tension of the spring 12 rotating either of the shafts 1 or 2 positioned forwardly and rearwardly of the driver's seat to cause either of the arms 19 to shift the indicator plate 17 from the position shown in Figure 4, to the dotted line position shown in Figure 8, disposing the indicator plate 17 rearwardly of the window opening 15 so that the luminous hand 18 is clearly viewable through said window either at day or night. When pressure is relieved upon the plunger rods 6 and 7, the springs 12 will elevate the plunger rod to the full line position shown in Figure 2 and displace the indicator plate 17 from the window opening 15 to the hidden position shown in Figure 4. The crank arm connection 4 between the shafts 1 and 2, and the plunger rods, causes a simultaneous operation of the aligned shafts 1 or 2 so that the signals disposed in the casings at the front and rear ends of the machine are simultaneously displayed. With a device of this character, it is unnecessary for an automobile operator to signal his intended direction of travel with his hands, as the indicator plates 17 are arranged both forwardly and rearwardly of the automobile and are clearly viewable whenever operated or moved to exposed position. The device is extremely simple in construction, inexpensive to manufacture and can be easily and quickly installed upon an automobile of any type.

While there is herein shown and described the preferred embodiment of my invention, it is to be understood that minor changes in the construction, combination and arrangement of parts may be made without departing from the spirit and scope of the invention.

Having thus described the invention, what I claim as new is:—

1. In an automobile direction indicator, a flat rectangular casing having a window in the front adjacent an end and provided with a longitudinal slot in the back, a signal member fitted in said casing to slide longitudinally into and out of registry with said window, a stem projecting through said slot from said member, a rock arm pivoted below said casing and having a slotted end engaging said stem, said rock arm being adapted for actuation by the operator of the automobile.

2. In an automobile direction indicator, a flat rectangular casing having a pair of windows in its front each adjacent a respective end, said casing being further provided with a pair of alined slots in its back, a pair of signal members fitted in said casing to slide rectilinearly into and out of registry with respective windows, stems projecting from said members through said slots, said slots and stems forming limit means for the movement of said members and being arranged to prevent one member interfering with the other, and independent rock arms pivoted adjacent the casing and adapted for actuation by the operator of the automobile, each of said rock arms having a slotted end engaging a respective stem.

In testimony whereof I affix my signature.

STEVE PAPP.